US007870221B2

(12) United States Patent
Matveief et al.

(10) Patent No.: US 7,870,221 B2
(45) Date of Patent: Jan. 11, 2011

(54) MULTIPLE BINDINGS IN WEB SERVICE DATA CONNECTION

(75) Inventors: Anatole Matveief, San Jose, CA (US); Jean Young, San Jose, CA (US); Chris Solc, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1066 days.

(21) Appl. No.: 11/019,970

(22) Filed: Dec. 20, 2004

(65) Prior Publication Data

US 2006/0136422 A1 Jun. 22, 2006

(51) Int. Cl.
G06F 15/16 (2006.01)
G06F 15/173 (2006.01)
G06F 17/21 (2006.01)

(52) U.S. Cl. .................. 709/217; 709/230; 709/238; 715/221; 715/224; 715/226; 715/234

(58) Field of Classification Search ......... 709/217–220, 709/223, 238, 250; 707/1–10; 715/517, 715/522, 208, 221–226, 234–236, 760
See application file for complete search history.

(56) References Cited

U.S. PATENT DOCUMENTS

| | | | | |
|---|---|---|---|---|
| 6,233,600 B1 * | 5/2001 | Salas et al. ................. | 709/201 |
| 6,247,029 B1 * | 6/2001 | Kelley et al. ............... | 715/207 |
| 6,499,042 B1 * | 12/2002 | Markus ...................... | 715/217 |
| 6,959,339 B1 * | 10/2005 | Wu et al. .................... | 709/246 |
| 6,976,065 B2 * | 12/2005 | Kaiser et al. ............... | 709/221 |
| 7,072,984 B1 * | 7/2006 | Polonsky et al. ........... | 709/246 |
| 7,120,646 B2 * | 10/2006 | Streepy, Jr. ................ | 707/104.1 |
| 7,168,035 B1 * | 1/2007 | Bell et al. ................... | 715/234 |
| 7,197,515 B2 * | 3/2007 | Rivers-Moore et al. ..... | 707/200 |
| 7,281,018 B1 * | 10/2007 | Begun et al. ................ | 707/102 |
| 7,287,218 B1 * | 10/2007 | Knotz et al. ................ | 715/209 |
| 7,406,660 B1 * | 7/2008 | Sikchi et al. ............... | 715/234 |
| 7,496,837 B1 * | 2/2009 | Larcheveque et al. ...... | 715/237 |
| 2002/0112085 A1 * | 8/2002 | Berg .......................... | 709/250 |
| 2003/0061200 A1 * | 3/2003 | Hubert et al. ............... | 707/3 |
| 2003/0061241 A1 * | 3/2003 | McGrath .................... | 707/200 |
| 2003/0233316 A1 * | 12/2003 | Hu et al. ..................... | 705/38 |
| 2004/0015778 A1 * | 1/2004 | Britton et al. .............. | 715/500 |
| 2004/0030693 A1 * | 2/2004 | Toda ........................... | 707/4 |

(Continued)

OTHER PUBLICATIONS

Adobe Systems Inc., XFA Specification Version 2.2, Oct. 1, 2004 (available at http://partners.adobe.com/public/developer/en/xml/xfapecification_2.2_draft.pdf).

(Continued)

Primary Examiner—Saleh Najjar
Assistant Examiner—Farzana Huq
(74) Attorney, Agent, or Firm—Fish & Richardson P.C.

(57) ABSTRACT

The invention features a method, system, and computer program product. User input defining a form that has one or more fields is received. User input defining a set of entries associated with the form is also received, the set of entries identifying available connections to data repositories and fields of the form that are associated with the connections. Each data repository is connected with the fields associated with the data repository using one or more declarative statements that enable one-to-many mappings from fields in the form to data repositories as defined by the set of entries.

8 Claims, 10 Drawing Sheets

U.S. PATENT DOCUMENTS

2004/0098368 A1* 5/2004 Sugawara et al. .............. 707/1
2004/0133451 A1* 7/2004 Kleinschmidt ................. 705/2
2005/0210263 A1* 9/2005 Levas et al. ................. 713/182

OTHER PUBLICATIONS

Apple Computers Inc., Dynamic HTML and XML: The XMLHttpRequest Object, May 12, 2004 (available at http://developer.apple.com/internet/webcontent/xmlhttpreq.html).

W3C, XML Schema Part 0: Primer Second Edition, Oct. 28, 2004 (available at http://www.w3.org/TR/2004/REC-xmlschema-0-20041028/).

W3C, XML Schema Part 1: Structures Second Edition, Oct. 28, 2004 (available at http://www.w3.org/TR/2004/REC-xmlschema-1-20041028/).

W3C, XML Schema Part 2: Datatypes Second Edition, Oct. 28, 2004 (available at http://www.w3.org/TR/2004/REC-xmlschema-2-20041028/).

ADO Technical Articles, "How Do I Use the Connection Object in ADO", Apr. 2, 1998, MSDN, Microsoft Corporation, http://msdn.microsoft.com/en-us/library/ms807027(printer).aspx, 6 pages.

* cited by examiner

MULTIPLE BINDINGS IN WEB SERVICE DATA CONNECTION

BACKGROUND

This description relates to form-based data storage and retrieval.

A form can have many fields. A design user, e.g., a person who is developing a form for use as part of a web page to be served to a workstation, might want to link one or more of these fields to a web service or data connection, so that the data contained in the field is provided as input to the web service or data connection. In addition, the user might want to link the same field or one or more of the other fields to the same (or other) web service or data connection, so that an output of the web service or data connection is used to populate the field. Linking a field to a web service or data connection involves associating the field with the data connection, such that the field either contains data that is transmitted to a data connection, receives data that is received from a data connection, or both. A data connection is a communication channel established between a client, such as a form, and a data repository, such as a web service, database, or extensible markup language (XML) data file. A web service is a specific type of data connection identified by a uniform resource indicator (URI), whose public interfaces and linkings are defined and described using XML. Further, the user may want the form to store the data contained within it in a manner that conforms to a particular schema.

Ordinarily, these tasks are achieved through the use of scripting. The user, or another individual specially trained in writing computer scripts, creates a script customized to the specific form. If the form is changed, or if a different web service or data connection needs to be linked to the form, the customized script is manually changed.

SUMMARY

In one aspect, the invention features a method, system, and computer program product. For entries that have been declared in a form and that identify available connections to data repositories and fields of the form that are associated with the connections, a one-to-many mapping from fields in the form to one or more data repositories using declarative statements is enabled.

Implementations may include one or more of the following features. The mapping may identify connections that provide input to the data repository. The mapping may identify connections that receive output from the data repository. The mapping may identify a first connection that provides input to a first data repository and a second connection that receives output from a second data repository. The first data repository and the second data repository may be the same data repository. One or more of the data repositories may be web services. The entries may be expressed in a markup language, and the markup language may be extensible markup language (XML). The set of entries may be comprised of connect elements and a connection set. The form may be a dynamic form.

In another aspect, the invention features a method, system, and computer program product. User input defining a form that has one or more fields is received. User input defining a set of entries associated with the form is also received, the set of entries identifying available connections to data repositories and fields of the form that are associated with the connections. Each data repository is connected with the fields associated with the data repository using one or more declarative statements that enable one-to-many mappings from fields in the form to data repositories as defined by the set of entries.

Implementations may include one or more of the following features. The user input defining a set of entries associated with the form may be received using a graphical user interface. The set of entries may be comprised of connect elements and a connection set. User input defining a selectable button associated with the form may be received, wherein the selectable button identifies a specific data repository. The user input defining a selectable button associated with the form may be received using a graphical user interface. One or more of the data repositories may be web services. The form may be expressed in a markup language, and the markup language may be extensible markup language (XML). The form may be a dynamic form.

The invention can be implemented to realize one or more of the following advantages. Fields can be declaratively bound to multiple data connections or web services for input, output, or both. Fields can be declaratively bound to a specific schema.

The details of one or more embodiments of the invention are set forth in the accompanying drawings and the description below. Other features and advantages of the invention will become apparent from the description, the drawings, and the claims.

DETAILED DESCRIPTION

Figure 1:
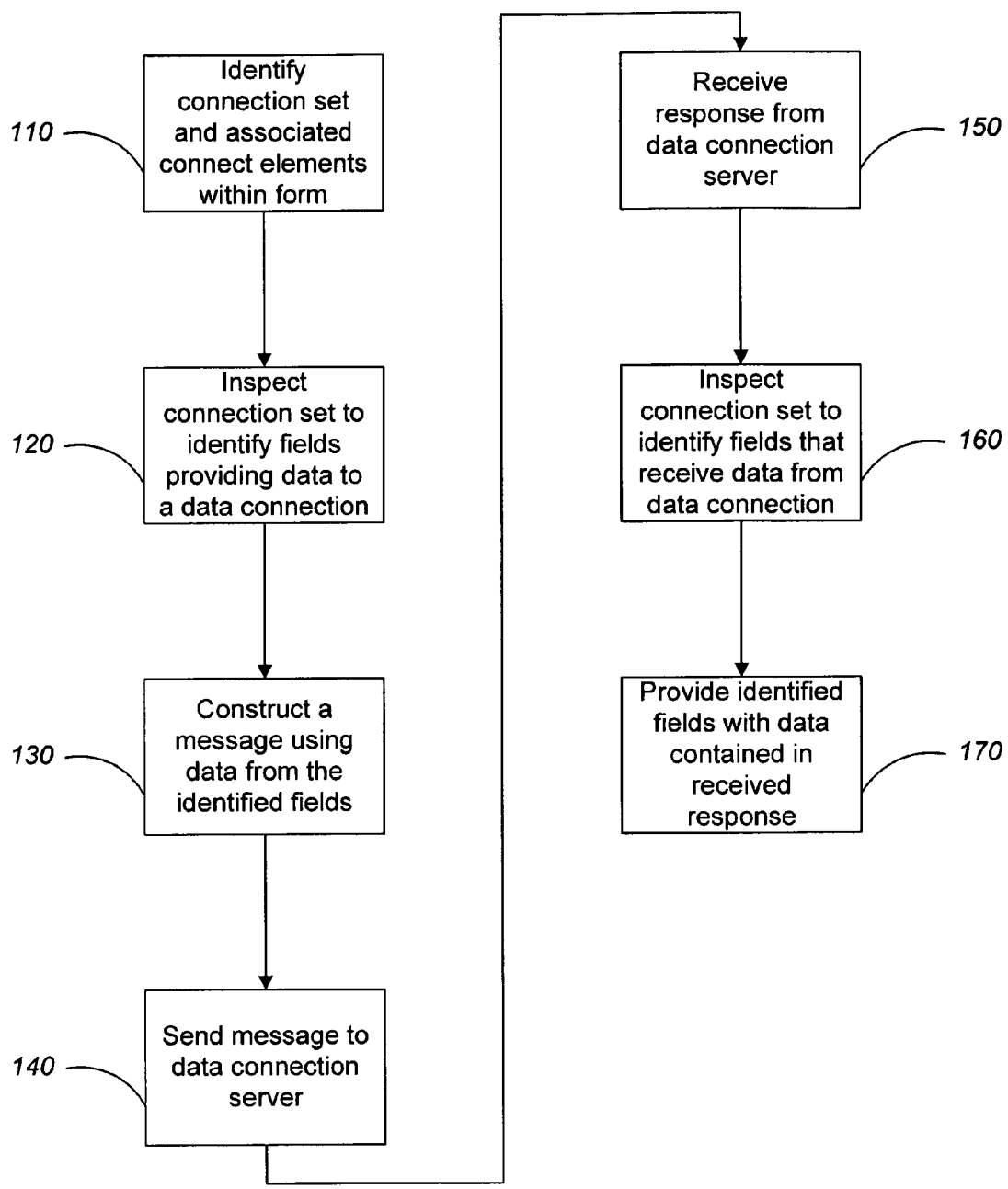
FIG. 1 is a flow chart illustrating a method for linking a field to multiple data connections during the processing of the form.

A form allows information to be entered by an end user and to be presented to the end user in an organized and logical format. A form can be implemented as an extensible markup language (XML) document. A form contains any number of fields. A field can be used to receive data from a user or from a data source, provide data to a data source, or display to a user data entered by the user or received from a data source. Data can also be calculated or created as a result of a script. Typically, the form is associated with one or more data connections. These associations are defined in a connection set; each association is a single element within the connection set. Information that is collected in the form can be sent to the data connection for further processing. Information can also be received from the data connection and displayed in the form. A data connection is a communication channel established between a client, such as a form, and a data repository, such as a web service, database, or XML data file.

Each form has a connection set; the following sample shows the structure of the connection set and its descendants:

```
<connectionSet
  xmlns="http://www.xfa.org/schema/xfa-connection-set/2.1/">
  <!-- zero or more of...-->
  <wsdlConnection dataDescription="ddName" name="cxnName">
    <operation input="inputElementName"
        output="outputElementName"> wsdlOperationName</operation>
    <soapAction>actionURI</soapAction>
    <soapAddress>endpointURI</soapAddress>
    <wsdlAddress>wsdlURI</wsdlAddress>
  </wsdlConnection>
  <!-- zero or more of... -->
  <xmlConnection dataDescription="ddName" name="cxnName">
    <uri>sampleDataURI</uri>
  </xmlConnection>
  <!-- zero or more of... -->
  <xsdConnection dataDescription="ddName" name="cxnName">
    <rootElement>elementName</rootElement>
    <uri>schemaURI</uri>
  </xsdConnection>
</connectionSet>
```

The fields within the form are associated with the connections through connect elements. The connect elements correspond to a particular action requested from a particular data connection, with data being sent in a particular direction or directions. The connect element for a field indicates if the field provides input, output, or both for the bound data connection. In some implementations, the data connection can be a web service.

Each connection element represents a connection between the form and a data connection. A connection element can link a form to a particular data connection. The connection element can also identify the operation to be invoked in the data connection. The connection element can also specify a data description that the exported data in the field should conform to in order for the data connection to accept, and subsequently process, the exported data.

In some implementations, a form can have a data description, known as a cached schema, that describes the structure of the data that will be used with a form, whether for input, export, or both. A data description contains details about the data that will be used as input, output or both to fields in the form. For example, the data description can define elements that can appear in a form, define attributes that can appear in a form, define elements that are child elements, define the order of child elements, define the number of child elements, define whether an element is empty or can include text, and define data types for elements and attributes.

In some implementations, multiple connect elements can be identified for a single field. For example, the system can handle more than one data connection on the same form, or associated with a particular field on the form. Alternatively, the system can handle a data connection that is both receiving data from and sending data to the form, or a particular field on the form.

FIG. 1 shows a method 100 for linking a field to multiple data connections during use of a predesigned form by an end user, and illustrates the process of exporting data to a connection. First, the system identifies the connection set and associated connect elements within a form (step 110). The connection elements are contained in a connection set associated with the form. The connect elements are contained in subforms and fields in the form.

The system then inspects the connection set associated with the form and the connect elements for each field or subform to identify fields providing data to a data connection (step 120). The system inspects the connect elements associated with each field to determine if the data contained in a particular field is designated to be transmitted to a particular one of the data connections. A field may have zero, one or many connect elements. Each connect element associates the field with a particular connection for input or output purposes. If there is no connect element associating a field with a particular data connection then the system temporarily ignores the field. As described below, the ignored field can be used during additional iterations for alternative data connections.

Next, a message is constructed using the data contained in the identified fields (step 130). The system collects the data from the fields identified in step 120, and constructs the message to be sent to the particular data connection. The message is formatted using the data description to conform with the requirements of the particular data connection, so that the particular data connection can recognize and identify the data contained in the message. In some implementations, the message is constructed in a simple object access protocol (SOAP) format.

The system then sends the message to a data connection (step 140). The data connection receives the message, and processes the data contained within the message.

The system receives a response from the data connection (step 150). The data connection constructs a response using the appropriate data, and sends the response to the system. In some implementations, the response is constructed in a simple object access protocol (SOAP) format.

The system then inspects the connection set associated with the form and the connect elements for each field or subform to identify fields that receive data from the data connection (step 160). The system inspects the connect elements associated with each field to determine if a particular one of the fields is designated to be the recipient of data received from a particular data connection. If the field does not have a connect element associating it with the data connection, or if the connect element does not indicate that the field receives data from the data connection, the system will ignore the field. As described below, the ignored field can be used during additional iterations for alternative data connections.

The system provides the identified fields with the data contained in the response (step 170). The system provides the appropriate data received from the data connection to the fields identified in step 160 above. In some implementations, the form can be recreated to reflect the quantity or type of data returned from the data connection. For example, the data connection might return a list of identification numbers. The form is designed such that each unique identification number is associated with a different field. In such an instance, the form can be recreated based on the number of unique identification numbers returned from the data connection, such that there is one field available for each identification number, regardless of the quantity of identification numbers returned from the data connection.

In some embodiments, the method 100 can be repeated for each data connection defined in a connection set. In this manner, the system can handle a form that is associated with multiple data connections. Further, this permits the use of data from one data connection to be used in conjunction with a second data connection. For example, a form might receive data from a first data connection, associate this data with a particular field, and then send it to a second data connection.

In some embodiments, the form is described as an XML document. In some implementations, the form is described using Adobe System's XML Form Architecture (XFA). Additional information about XFA may be found in the XFA Specification version 2.2 available from Adobe Systems, Inc.

at http://partners.adobe.com/public/developer/en/xml/xfapecification_2.2_draft.pdf and incorporated here by reference. Additional information about the W3C XML Schema (XMLSchema) may be found in the XMLSchema available from the World Wide Web Consortium at http://www.w3.org/XML/Schema#dev and incorporated here by reference.

Using the XFA format, the author of a form can link form fields to data connections. For example, in a web-interactive form, an author can configure form elements to dynamically request that a server provide additional information and then populate the form with the delivered information. Further, the author can design the form so that it can select from multiple servers depending on the data view.

XFA is a declarative language. A declarative language is made up of sets of definitions or equations describing relations that specify the task to be performed, but not how it is to be performed. For example, in the example presented above, the connection set and connect elements provide a set of declarative statements to map fields in a form to specific data repositories. This is in contrast to a procedural language, such as a scripting language, which describe relationships in terms of a specific sequence of actions.

There can be multiple views for the same data. XFA provides a mechanism to specify a single optional default data description and any number of optional context-specific data descriptions, via a mechanism outside of the data document.

XFA applications can produce XML data output in several different contexts. The XML output document can be the final product of the XFA application. The XML output document can also be sent to an HTTP host via the SUBMIT action. Alternatively, the XML output document can be sent to a web service or other data connection. In the last instance, the XFA application will probably receive a reply, itself in XML format. Each of these contexts is known as a connection.

Data descriptions are contained in an XML data package (XDP) inside a dataSets packet. Each data description is enclosed within a datadescription element. Each dataDescription element has a name attribute, and the value of the name attribute must be unique within the set of dataDescription names for an XDP. One dataDescription element may have a name equal to the name attribute of the template's root subform.

The data description itself (the content of the dataDescription element) is a picture of the data structure, without content but with optional namespace markup. In some implementations, the data structure can have content. For example, consider the following sample data:

```
<po:order xmlns:po="http://www.abc/order">
    <po:orderid>A314</po:orderid>
    <po:customer>
        <po:lastname>Coyote</po:lastname>
        <po:firstname>Wile</po:lastname>
    </po:customer>
    <po:item>
        <po:desc>super magnet</po:desc>
        <po:qty>1</po:qty>
    </po:item>
</po:order>
```

The simplest data description for this document is generated simply by stripping out the text content from the sample data, as follows:

```
<dd:dataDescription
    xmlns:dd="http://ns.adobe.com/data-description/"
    name="order">
    <po:order xmlns:po="http://www.abc/order">
        <po:orderid/>
        <po:customer>
            <po:lastname/>
            <po:firstname/>
        </po:customer>
        <po:item>
            <po:desc/>
            <po:qty/>
        </po:item>
    </po:order>
</dd:dataDescription>
```

Namespace markup provides a way to specify alternate structure and repeated or optional elements. Most of the markup consists of data description grammar attributes markup identified by the data description namespace http://ns.adobe.com/data-description/(in the example below, the "dd:" prefix identifies an element or attribute as belonging to the data description namespace) applied to elements not within the data description namespace. In addition a dd:group element, which does not correspond to an element in the data document, is provided for more complicated cases. For example, the following data description relaxes the previous data description using added dd: markup:

```
<dd:dataDescription
    xmlns:dd="http://ns.adobe.com/data-description/"
    name="order">
    <po:order xmlns:po="http://www.example.com/order">
        <po:orderid/>
        <po:customer>
            <po:lastname/>
            <po:firstname dd:minOccur="0"/>
        </po:customer>
        <po:item dd:maxOccur="-1">
            <po:desc/>
            <po:qty/>
        </po:item>
    </po:order>
</dd:dataDescription>
```

This data description still matches the original sample data, but the markup makes it more flexible. For example, it also matches the following data which has no "po:firstname" element and has multiple "po:item" elements:

```
<po:order xmlns:po="http://www.example.com/order">
    <po:orderid>A314</po:orderid>
    <po:customer>
        <po:lastname>Coyote</po:lastname>
    </po:customer>
    <po:item>
        <po:desc>super magnet</po:desc>
        <po:qty>1</po:qty>
    </po:item>
    <po:item>
        <po:desc>steel ball bearing</po:desc>
        <po:qty>1000</po:qty>
    </po:item>
    <po:item>
        <po:desc>mallet (large)</po:desc>
        <po:qty>1</po:qty>
    </po:item>
</po:order>
```

The components of the dd: markup can include the following. The dd:dataDescription element is the container for a data description. dd:name attribute supplies a name for the data description. The attribute must be supplied and the name must be unique across dataDescription elements. If the name is the same as the name of the template's root subform, this data description is the default data description. The value of this attribute must match a subform name, so it must be a valid XFA name.

The dd:maxOccur sets the maximum number of times the element may occur in a contiguous sequence. The default is 1, that is, by default no more than one occurrence is allowed. The special value −1 means that there is no limit to the number of times the element may repeat. If the value is not −1 it must be a positive integer.

For example, the following fragment declares that it is acceptable for the "po:item" element to repeat without limit. In such a way, a single purchase order can list any number of purchased items.

```
<po:item dd:maxOccur="-1">
    <po:desc/>
    <po:qty/>
</po:item>
```

Another example is the following fragment, which declares that the number of "attendee" elements inside the "meeting" element is limited to twelve (perhaps the capacity of the room):

```
<meeting>
    <attendee dd:maxOccur="12">
</meeting>
```

The dd:minOccur attribute sets the minimum number of times the element must occur in a contiguous sequence. The default is 1, that is, by default at least one occurrence is required. The value 0 means that the element is optional. If the value is not 0 it must be a positive integer.

For example, the following fragment declares that "firstname" is not required in the purchase order. Without the dd:minOccur attribute the value of "firstname" could be the empty string but the element could not be omitted entirely. On the other hand "lastname" continues to be mandatory.

```
<po:customer>
    <po:lastname/>
    <po:firstname dd:minOccur="0"/>
</po:customer>
```

Hence the following fragment of data is valid:

```
<po:customer>
    <po:lastname>Smith</po:lastname>
</po:customer>
```

In an alternative example, the following fragment declares that a meeting must be attended by at least two people:

```
<meeting>
    <attendee dd:minOccur="2"/>
</meeting>
```

The dd:model attribute controls the way in which the children of the element are related. The value of dd:model must be one of the following: choice, ordered, or unordered. If the value of dd:model is choice, the data must have a child element or elements corresponding to just one of the children of this element.

If the value of dd:model is ordered, the data must have child elements corresponding to each of the children of this element (except for children with dd:minOccur equal to 0, which are optional). The children must occur in the same order that they are declared here. This is the default.

If the value of dd:model is unordered, the data must have child elements corresponding to each of the children of this element (except for children with dd:minOccur equal to 0, which are optional). The children may occur in any order.

The following sample fragment illustrates a simple use of dd:model with a value of choice:

```
<payment dd:model="choice">
    <cash/>
    <visa/>
    <amex/>
</payment>
```

The following example fragment illustrates what happens when a child element governed by choice has a dd:maxOccur greater than one. In the example, a pizza order can be the house special or it can have à la carte toppings. If the pizza is à la carte, multiple toppings may be specified. On the other hand if the house special is chosen toppings must not be specified. The dd:model attribute with a value of choice makes "houseSpecial" and "topping" mutually exclusive:

```
<pizza dd:model="choice">
    <houseSpecial/>
    <topping dd:maxOccur="-1">
    <pizza/>
```

Hence the following fragment of data is valid:

```
<pizza>
    <houseSpecial>
</pizza>
```

But the following is also valid:

```
<pizza>
    <topping>pepperoni</topping>
    <topping>green peppers</topping>
    <topping>onions</topping>
</pizza>
```

The following fragment illustrates a simple use of dd:model with a value of ordered. The fragment declares that the address in the data must have each of the child elements in the exact order given. Any child element may be empty but it must be present.

```
<address dd:model="ordered">
    <streetNumber/>
    <streetName/>
    <city/>
    <postalCode/>
</address>
```

Hence the following fragment of data is valid:

```
<address>
    <streetNumber>47</streetNumber>
    <streetName>Main Street</streetName>
    <city/>
    <postalCode/>
</address>
```

Since ordered is the default, the same result would be obtained by omitting the dd:model attribute entirely.

The following fragment illustrates a simple use of dd:model with a value of unordered. It is the same as the previous example except for the value of dd:model.

```
<address dd:model="unordered">
    <streetNumber/>
    <streetName/>
    <city/>
    <postalCode/>
</address>
```

The result is almost the same as the previous example using ordered, but more forgiving. Any data document that matches the previous example will also match this data description. In addition, this data description also matches data documents in which the order of the "streetNumber", "streetName", "city", and "postalCode" elements is switched around. However they are all still required to be present. Hence the following fragment of data is valid:

```
<address>
    <city/>
    <streetName>Main Street</streetName>
    <postalCode/>
    <streetNumber>47</streetNumber>
</address>
```

The following sample fragment illustrates the effect of combining unordered with one or more children having dd:minOccur set to a value of 0. Any element with dd:minOccur set to a value of 0 is optional.

```
<address dd:model="unordered">
    <streetNumber/>
    <streetName/>
    <city dd:minOccurs="0"/>
    <postalCode dd:minOccurs="0"/>
</address>
```

Given the above data declaration fragment, the following data fragment is valid:

```
<address>
    <streetName>Main Street</streetName>
    <streetNumber>47</streetNumber>
</address>
```

A null node is distinct from a node with content of the empty string. A null node has no value at all—it is null in the database sense. The base XML 1.0 standard (XML1.0) does not provide a standard way to represent null nodes. The dd:nullType attribute controls the mapping between data elements and null nodes in a document object model (DOM). Sometimes an empty element is represented internally as a null node, but other times it is represented as a normal node with a value of the empty string. The dd:nullType attribute specifies which method is used for this element and, unless overridden, inherited by its descendants.

The value of the attribute must be one of the following: empty, exclude, or xsi. With the nullType attribute set to a value of "empty," on output null nodes are represented by empty elements. On input empty elements are mapped to null nodes, as are elements marked as null in the xsi namespace (the xsi namespace is defined at http://www.w3.org/2001/XMLSchema-instance), using xsi:nil="true". This is the default.

With the nullType attribute set to a value of "exclude," on output null nodes are excluded from the XML document. On input elements marked as null using xsi:nil="true" are mapped to null nodes. Elements that are empty but not marked using xsi:nil="true" are mapped to regular nodes with values of the empty string. Note that when the element has dd:nullType set to exclude it must also have a dd:minOccur attribute set to 0. Failure to uphold this rule would lead to a schema violation when the node was null because dd:nullType would require that the element be omitted and at the same time dd:minOccur would require that it be included.

With the nullType attribute set to a value of "xsi," on output null nodes are represented by empty elements with the attribute xsi:nil equal to true, as defined in XML Schema. On input any element (empty or not) with xsi:nil="true" is mapped to a null node, while empty elements that do not have xsi:nil="true" are mapped to regular nodes with values of the empty string.

The dd:reqAttrs attribute lists the names of mandatory attributes for the element. The names in the list are separated by white space. The order of the names is not significant. Each name in the list must match the name (including namespace) of an attribute on the element. If an attribute name in the list has no namespace prefix it is imputed to inherit the namespace of the element.

On input an attribute with the value of empty string is treated the same way as any other attribute. On output, when an attribute is mandatory but the attribute is not present in the DOM, the XFA application generates an attribute with the value of the empty string. By contrast when the attribute is not mandatory and it is not present in the DOM it is omitted from the XML document.

For example, the following fragment declares that in the "shirt" element the attributes "color" and "size" are mandatory, but "supplier" is optional. All of the attributes inherit the namespace of their element.

```
<t:shirt color=" " supplier=" " size=" " dd:reqattrs="size color"/>
```

The following example declares two mandatory attributes. The element is in the default namespace. One of its mandatory attributes is also in the default namespace, but the other is in a different namespace.

```
<animal name=" " vet:species=" " dd:reqattrs="name vet:species"/>
```

The XML Data Package (XDP) format provides a mechanism for packaging units of form-related content within a surrounding XML container. Such form-related content may include PDF objects, XFA form data, and custom XFA-related form content. Packaging form-related content within an XML container may be important for XML-based applications that produce or consume XFA form content. An XFA processing application can produce an XDP document when it submits a form (or a form's data) to a server or when web services are activated.

A connection is a link between a subset of the data in the form DOM and some external entity. An XDP can potentially have many data descriptions and potentially many connections for each data description. The set of connections is contained within the XDP inside a connectionSet packet. There can be at most one connectionSet packet per XDP. Within the connectionSet packet there can be any number of wsdlConnection elements. The order of multiple wsdlConnection elements is not significant, but they must each have a unique name attribute.

An xmlConnection element associates a data description with sample XML data. An xsdConnection element associates a data description with an external schema in XMLSchema format. Both xmlConnection and xsdConnection can be used for data which is to be exported as and/or imported from a standalone XML document. By contrast, a wsdlConnection element describes how the form interacts with a WSDL-based service using SOAP doc-literal operations.

Any subform, field, or exclusion group in the form DOM can be associated with a connection by a connect element. This causes the content of the subform, field, or exclusion group to be included in the data transferred by that connection. A given subform, field, or exclusion group can be associated with any number of different connections.

The following skeleton summarizes the structure of the connection set and its descendants:

```
<connectionSet
  xmlns="http://www.xfa.org/schema/xfa-connection-set/2.1/">
  <!-- zero or more of...-->
  <wsdlConnection dataDescription="ddName" name="cxnName">
    <operation input="inputElementName"
      output="outputElementName"
      >wsdlOperationName</operation>
    <soapAction>actionURI</soapAction>
    <soapAddress>endpointURI</soapAddress>
    <wsdlAddress>wsdlURI</wsdlAddress>
  </wsdlConnection>
  <!-- at most one of either this... -->
  <xmlConnection dataDescription="ddName" name="cxnName">
    <uri>sampleDataURI</uri>
  </xmlConnection>
```

```
  <!-- ...or this... -->
  <xsdConnection dataDescription="ddName" name="cxnName">
    <rootElement>elementName</rootElement>
    <uri>schemaURI</uri>
  </xsdConnection>
</connectionSet>
```

The connectionSet element is the container for the set of connections. There must be at most one connectionSet element in an XDP. The connectionSet element may contain any number of wsdlConnection elements and at most one of either xmlConnection or xsdConnection elements.

The operation element declares the SOAP operation that is associated with its enclosing wsdlConnection element. SOAP allows multiple operations to share the same name. If this occurs, the input and output attributes are used to disambiguate. The input attribute is the name of the operation's input element. If this attribute is not supplied the operation takes the default input name as specified in the WSDL specification. The output attribute is the name of the operation's output element. If this attribute is not supplied the operation takes the default output name as specified in the WSDL specification. The content is the name of the selected operation.

The rootElement element declares the starting point (root) within the associated XMLSchema. The content of the rootElement element is the name of the outermost element that was used when generating the data description from the associated XMLSchema.

The soapAction element declares the SOAP action for its parent wsdlConnection. The content of the soapAction element is the uniform resource identifier (URI) for the SOAP action. When the request is sent to the server, this is the value of the soapAction attribute of the soap:operation element.

The soapAddress element declares the host location for its parent wsdlConnection. The content of the soapAddress element is the address of the SOAP end point. A SOAP end point consists of a protocol and a data format bound to a network address. When the request is sent to the server, this is the value of the location attribute of the soap:address element.

The uri element declares the location of the sample document or schema for its parent xmlConnection or xsdConnection. The content of the uri element is the URI for the sample document or schema.

The wsdlAddress element identifies the location of the service description to which the enclosing wsdlConnection element and its contents correspond. The content of the wsdlAddress element is the URI for the service description.

The wsdlConnection element represents one connection to a web service. This connection corresponds to a particular action requested from a particular service with data going in a particular direction or directions. The dataDescription attribute is the name of the associated data description. The name attribute is the name of the connection. The name must be unique among connections. The content of the wsdlConnection element is an operation element, a soapAction element, a soapAddress element, and optionally a wsdlAddress element.

The xmlConnection element represents a connection to sample data. This connection encapsulates the information that a data description was derived from a particular sample XML data document. This information is not needed by consumers of the form but may be useful for applications that modify the form template or the associated data description. The dataDescription attribute is the name of the associated data description. The name attribute is the name of the connection. The name must be unique among connections. The content of the xmlConnection element is a URI element.

The xsdConnection element represents a connection to a schema. This connection encapsulates the information that a data description was derived from a particular XML Schema. This information is not needed by consumers of the form but may be useful for applications that modify the form template or the associated data description. The dataDescription attribute is the name of the associated data description. The name attribute is the name of the connection. The name must be unique among connections. The content of the xsdConnection element is a URI element.

The data description for a web service describes the schema for the input message (from client to server). The schema described by the data description are wrapped within an element named using the connection name.

For example, the following data description declares the message schema to use with a web service connection called "POConnection":

```
<dd:dataDescription
  xmlns:dd="http://ns.adobe.com/data-description/"
  dd:name="ExampleSoapInfo">
    <POConnection>
        <soap:Body
          xmlns:soap="http://schemas.xmlsoap.org/soap/envelope/">
            <po1:orderItem
              xmlns:po1="http://www.example.com/po1">
                <po1:OrderId/>
                <po1:Description dd:minOccur="0"/>
                <po1:Quantity/>
            </po1:orderItem>
        </soap:Body>
    </POConnection>
</dd:dataDescription>
```

In the above example, the soap:Body element contains the schema for the message. The optional soap:Header element has been omitted.

In some implementations, the data connection may be a web service. Web services provide a flexible communication interface between many different systems, allowing clients to submit data to and request data from servers, databases, custom systems, vendors exposing web services, and others. XFA enables fields to connect to web services and thus access any of these facilities.

The web service architecture has the following capabilities. Fields and exclusion groups can act as either senders of data to a particular web service, receivers of data from the web service, or both. A field or exclusion group is not limited to a single web service. Instead, it has the ability to interact with different web services at different times. Data can be coerced into a web service's input message schema, as defined by a provided data description. The coercion is done in a separate DOM (the Connection Data DOM) so it does not affect the regular Data DOM. The root node for the Connection Data DOM is xfa.datasets.connectionData (also known as !connectionData).

Scripts in the template can inspect and modify the data while it is in the Connection Data DOM. Data returned from the web service is retained in the Connection Data DOM in its own schema. Scripts in the template can inspect and modify data returned from a web service while it is retained in the connection DOM. Data from a web service can be imported into the existing Form DOM, or used to create a new Form DOM.

In a sample web service transaction, the cycle of operation is as follows. First, an event object is activated. The event object has an execute property. The execute property has a connection subproperty which names a particular connection within the connectionSet. Next, the XFA application marshals the complete SOAP message in the Connection Data DOM. The schema for the message comes from the data description named by the connection's dataDescription property. The message includes data from all subforms, fields, and exclusion groups that are linked to the connection by their connect children. Each connect child supplies a pointer mapping to a node in the message where its parent's data is copied.

Then, the preExecute event is triggered. If there is a script associated with it, the script has a chance to examine and modify the message in the Connection Data DOM. For example, the script may add additional SOAP headers. Following this, the XFA application serializes the message in the Connection Data DOM to XML and constructs the input message for the service. The XFA application then sends the input message to the server.

Next, the server performs the operation. The server sends a reply to the XFA application. The reply may include an output message. If the operation has an output message, it contains data serialized as XML. The XFA application loads the data from the received message into the Connection Data DOM, replacing the input message that was there previously.

The postExecute event is triggered. If there is an associated script it runs. While the script is running $event.soapFaultCode and $event.soapFaultString are set to the received fault code and fault string. These are contained in the soap:faultcode and soap:faultstring elements, respectively, inside the soap:fault element. If the operation succeeded there is no soap:fault element and both event properties default to the empty string (" "). The script can detect success by checking for an empty string in $event.soapFaultCode. In some implementations, the script can also inspect and modify the received data in the Connection Data DOM before it is imported into the Form DOM. For example, it can check for headers.

Next, the XFA application imports the received data into the Form DOM. There are two ways the XFA processor can carry out the importation. In some embodiments, when the executeType property of the event object is set to import, it simply updates the data that is bound to the output of the connection. However, this does not support dynamic subforms, which are inserted into the form where required and/or as often as required by the data. In an alternative embodiment, for dynamic subforms the XFA processor clears the Form DOM and rebuilds it using a merge (data binding) operation. This is done when the executeType property of the event object is set to remerge.

As the XFA processor builds the Form DOM, when it comes to a candidate field or exclusion group associated with the current connection, it reaches into the Connection Data DOM and plucks the associated data (if any) from there. If the field or exclusion group was already bound to data in the Data DOM then the new data propagates through to the Data DOM, updating the node that is already there; otherwise a new data node is created to hold the data. Finally, the message in the Connection Data DOM is deleted.

The following example uses a simple stock-quote web service. In order to use the service the client sends a message to the server containing a header and a ticker symbol. The server replies with a message containing status information and, if the query is successful, the current stock price. The web service description file for the service follows:

```
<?xml version="1.0"?>
<definitions name="StockQuote"
    targetNamespace="http://example.com/stockquote.wsdl"
    xmlns:tns="http://example.com/stockquote.wsdl"
    xmlns:xsd1="http://example.com/stockquote.xsd"
    xmlns:soap="http://schemas.xmlsoap.org/wsdl/soap/"
    xmlns="http://schemas.xmlsoap.org/wsdl/">
<types>
    <schema targetNamespace="http://example.com/stockquote.xsd"
        xmlns="http://www.w3.org/2000/10/XMLSchema">
        <element name="TradePriceRequest">
            <complexType>
                <all>
                    <element name="tickerSymbol" type="string"/>
                </all>
            </complexType>
        </element>
        <element name="TradePrice">
            <complexType>
                <all>
                    <element name="price" type="float"/>
                </all>
            </complexType>
        </element>
    </schema>
</types>
<message name="GetLastTradePriceInput">
    <part name="body" element="xsd1:TradePriceRequest"/>
</message>
<message name="GetLastTradePriceOutput">
    <part name="body" element="xsd1:TradePrice"/>
</message>
<portType name="StockQuotePortType">
    <operation name="GetLastTradePrice">
        <input message="tns:GetLastTradePriceInput"/>
        <output message="tns:GetLastTradePriceOutput"/>
    </operation>
</portType>
<binding name="StockQuoteSoapBinding"
    type="tns:StockQuotePortType">
    <soap:binding style="document"
        transport="http://schemas.xmlsoap.org/soap/http"/>
    <operation name="GetLastTradePrice">
        <soap:operation
            soapAction="http://example.com/GetLastTradePrice"/>
        <input>
            <soap:body use="literal"/>
        </input>
        <output>
            <soap:body use="literal"/>
        </output>
    </operation>
</binding>
<service name="StockQuoteService">
    <documentation>My first service</documentation>
    <port name="StockQuotePort"
        binding="tns:StockQuoteBinding">
        <soap:address location="http://example.com/stockquote"/>
    </port>
</service>
</definitions>
```

This definition file tells potential clients how to access the service. The types element defines XML components for use in the other sections. The two message elements define the two messages that are used. The portType element defines the operations and how they use messages. The binding element defines how the messages bind to the SOAP protocol (GetLastTradePriceInput as the input message and GetLastTradePriceOutput as the output message). The service element defines the URL of the server and the name of the service (port).

The input message defined by the above WSDL definition carries a ticker symbol for a publicly-listed corporation. The message has the following form:

```
<soap:Body
    xmlns:soap="http://schemas.xmlsoap.org/soap/envelope/">
    <tns:TradePriceRequest>
        <tns:tickerSymbol>stockTickerSymbol</tns:tickerSymbol>
    </tns:TradePriceRequest>
</soap:Body>
```

If the query succeeds (that is, if a share quotation can be obtained for the given ticker symbol), the output message carries the price per share for the requested corporation. It has the following form:

```
<soap:Body
    xmlns:soap="http://schemas.xmlsoap.org/soap/envelope/">
    <tns:TradePrice>
        <tns:price>pricePerShare</tns:price>
    </tns:TradePrice>
</soap:Body>
```

If the query fails (for example because there is no known listing for the given ticker symbol), the output message carries a status indicator. It has the following general form (with whitespace added for clarity):

```
<soap:Body
    xmlns:soap="http://schemas.xmlsoap.org/soap/envelope/">
    <soap:Fault>
        <faultcode>Client.Authentication</faultcode>
        <faultstring>Internal Error</faultstring>
    </soap:Fault>
</soap:Body>
```

The soap:Fault element can also contain a faultactor element.

The service defined by this definition file can include many individual operations. However a wsdlConnection element describes just one operation. Therefore, many wsdlConnection elements can be used to fully describe a service. However, the simple service in this example supports only one operation, so in this case only wsdlConnection element is needed. The complete connection set packet (with white space added for clarity) follows:

```
<connectionSet
    xmlns="http://www.xfa.org/schema/xfa-connection-set/2.1/">
    <wsdlConnection
        dataDescription="DataConnectionTradePriceRequestDD"
        name="TradePriceWS">
        <wsdlAddress>
            http://example.com/stockquote.wsdl
        </wsdlAddress>
        <soapAction>
            http://example.com/GetLastTradePrice
        </soapAction>
        <soapAddress>
            http://example.com/StockQuote
        </soapAddress>
        <operation input="GetLastTradePriceInput"
            output="GetLastTradePriceOutput">
            TradePriceRequest
        </operation>
    </wsdlConnection>
</connectionSet>
```

The wsdlConnection element has two attributes which link it to other parts of the XDP. The dataDescription attribute points to a data description, which must be created. The name attribute supplies a name for this connection which will be used in connect elements to indicate that the content of a field, exclusion group, or subform takes part in the transaction. The wsdlAddress child of the wsdlConnection element contains the URL of the web service definition. This is optional information for the use of form creation tools.

The soapAction child of wsdlConnection is copied from the soapAction attribute of the soap:operation element in the WSDL definition file. Similarly the soapAddress child of wsdlConnection is copied from the location attribute of the soap:address element in the WSDL definition file.

A web service definition may define any number of operations. The operation child of wsdlConnection in the XDP identifies which operation defined by the associated web service is selected for this data connection. In the above example, the service exposes one operation, identified by the string "TradePriceRequest". This is the content of the operation element. The input and output attributes identify the element definitions for the input and output messages respectively, in the WSDL definition.

A section of a sample template that imports the returned data follows:

```
<subform name="output" ... >
    <subform name="response">
        <field name="sharePrice" ...>
            ...
            <connect
              connection="TickerPriceWS"
              ref="!connectionData.TickerPriceWS.Body.
              TradePrice.price"
              usage="importOnly"/>
        </field>
        ...
    </subform>
    ...
</subform>
```

The associated data description controls the format of the message sent by the XFA application to the web server. This message includes the input message defined by the WSDL description and a SOAP envelope around it. In the example the data description packet is:

```
<dd:dataDescription
  xmlns:dd="http://ns.adobe.com/data-description/"
  dd:name="DataConnectiongetTradePriceRequestDD">
    <TradePriceWS>
        <soap:Body
          xmlns:soap="http://schemas.xmlsoap.org/soap/envelope/">
            <tns:TradePriceRequest>
                <tns:tickerSymbol/>
            </tns:TradePriceRequest>
        </soap:Body>
    </TradePriceWS>
</dd:dataDescription>
```

This data description matches the input message "GetLastTradePriceInput" from the WSDL service description. The data description merely describes the message format, but does not define the binding of data in the Data DOM to the message. This binding is performed by the individual connect children of fields, exclusion groups, and/or subforms in the Form DOM.

This data description does not include a schema for the output message. This is not required because XFA does not require a schema to import data. The structure of data in the Data DOM is unlikely to match the required structure for input and output messages, more so because a single form may exchange data with any number of web services. In addition, the messages are wrapped in SOAP envelopes which may also contain information of interest. Therefore, the input message is sent from, and the output message received into, a separate DOM called the Connection Data DOM.

The Connection Data DOM is located under the node "xfa.datasets.connectionData" (or equivalently "!connectionData"). Fields and exclusion groups can have connect children which associate them with particular nodes in the Connection Data DOM. The connect children control the movement of data between the Data DOM and the Connection Data DOM, in either or both directions. Each connect child controls only that particular data value which is bound to its parent.

In the example there are two wrapper subforms involved in data transfer. The subform input and its contents provide the input message, while output and its contents display the output message. The section of the template containing input is reproduced below:

```
<subform name="input" ...>
    <subform name="query">
        <field name="stockTickerSymbol" ...>
            ...
            <connect
              connection="TradePriceWS"
              ref="!connectionData.TickerPriceWS.Body.
              TradePriceRequest.tickerSymbol"
              usage="exportOnly"/>
        </field>
        ...
    </subform>
    ...
</subform>
```

For each connect element, the connection attribute identifies a wsdlConnection in the connectionSet. The connect element has no effect except when the XFA processor is exchanging data with the service represented by that particular connection.

The ref attribute is a modified script object model (SOM) expression identifying the location of the node in the Connection Data DOM corresponding to the subform, field, or exclusion group. Note that ref must point to a node inside the Connection Data DOM. When the SOM expression is fully qualified it is a standard SOM expression. Hence in the example the contents of the field are mapped to the node xfa.datasets.connectionData.TickerPriceWS.Body.TradePriceRequest.tickerSymbol which is in the Connection Data DOM. Body refers to a SOAP element that contains the message to be sent inside the SOAP envelope.

When the SOM expression is relative the base location is inherited from the connect child of the enclosing container, instead of being the location in the Form DOM of the container that asserts the SOM expression. Consider the following modified template fragment for input:

```
<subform name="input" ...>
    <connect
        connection="TradePriceWS"
        ref="!connectionData.TickerPriceWS.Body"
        usage="exportOnly"/>
    <subform name="query">
        <connect
            connection="TickerPriceWS"
            ref="TradePriceRequest"
            usage="exportOnly"/>
        <field name="stockTickerSymbol" ...>
            ...
            <connect
                connection="TickerPriceWS"
                ref="tickerSymbol"
                usage="exportOnly"/>
        </field>
        ...
    </subform>
    ...
</subform>
```

In this example, the input subform has a ref property asserting a fully-qualified SOM expression "!connectionData.TickerPriceWS.Body". Because this is fully-qualified it does not matter what base value, if any, it inherits from its parent. The expression resolves to xfa.datasets.connectionData.TickerPriceWS.Body. Its child subform TradePriceRequest inherits the node xfa.datasets.connectionData.TickerPriceWS.Body as its base location. The TradePriceRequest subform in turn has a connect.ref asserting a relative SOM expression, "TradePriceRequest". This combines with the inherited base, resolving to xfa.datasets.connectionData.TickerPriceWS.Body.TradePriceRequest. This resolved node in turn becomes the base location inherited by the field stockTickerSymbol, which is the child of input. The field has a connect.ref asserting the relative SOM expression "tickerSymbol". This combines with the inherited base to resolve into xfa.datasets.connectionData.TickerPriceWS.Body.TradePriceRequest.tickerSymbol. Hence the effect is the same as the earlier syntax.

The usage attribute controls whether data is copied from the Data DOM to the Connection Data DOM (exportOnly), from the Connection Data DOM to the Data DOM (importOnly), or both ways (exportImport). The effect of copying data both ways with exportimport is to update the data. This is not required for the example application. Hence in the example fragments the field associated with the input message has a connect usage of exportOnly.

After the message is marshalled in the Connection Data DOM, but before it is sent, the preExecute event triggers. A script activated by preExecute can modify the input message before it is sent. It is also acceptable for a preExecute script to programmatically copy data out of the Connection Data DOM. For example, the following fragment shows some debug code in a test template:

```
<field name="PREEXECUTE" ...> ... </field>
<event activity="preExecute"
    ref="$connectionSet.TickerPriceWS">
    <script>
        PREEXECUTE =
            $xfa.datasets.connectionData.TickerPriceWS.saveXML( );
    </script>
</event>
```

After the preExecute event finishes, the input message in the Connection Data DOM is converted to XML and sent to the web server. The web server replies with the output message, also in XML. In the example, if the query succeeds, the output message contains the share price for the requested stock. This data is wrapped inside a SOAP envelope. In addition, when the query fails, the element soap:Fault is returned. As described in the SOAP specfication, the soap:Fault element is a child of the soap:Bodyelement. soap:Fault contains a fault code and a human-readable fault string. When the query succeeds the message does not contain a soap:Fault element.

If there is a communication error, or an error reported by the HTTP protocol, the XFA client is unable to receive the output message. In this case the client generates an error message, clears the Connection Data DOM, and terminates the transaction.

Upon receipt of the output message, the client XFA processor parses it and stores its content to the Connection Data DOM. At this point if a soap:Fault element was returned the XFA processor clears the Connection Data DOM and the transaction is finished. However, if no soap:Fault element was received the XFA processor proceeds to import the received data from the Connection Data DOM into the main Data DOM.

The usage attribute of each connect element controls whether the associated data is copied from the Data DOM to the Connection Data DOM (exportOnly), from the Connection Data DOM to the Data DOM (importOnly), or both ways (exportImport). The same node in the Connection Data DOM can receive exported data from one node in the Data DOM while supplying imported data to another node in the Data DOM, using one connect.usage set to exportOnly and another set to importOnly. This is not necessary for the example template because the web service uses a separate element for the data returned by the query.

After the data has been copied from the Connection Data DOM to the Form DOM and Data DOM the transaction is complete. At this point the XFA processor can clear the Connection Data DOM. This prevents any possible interference between consecutive web service transactions and simplifies security analysis.

There must also be some way to trigger the data exchange with the web service. In some implementations, this can be done using an execute child of event. For example,

```
<field name="getQuoteBtn" ...>
    ...
    <ui>
        <button ... />
    </ui>
    <event activity="click" runAt="client">
        <execute connection="TickerPriceWS"
            executeType="import"/>
    </event>
</field>
```

The field getQuoteBtn is a button. When the end user clicks on the button, the XFA processor initiates the web service transaction. The execute element has a runAt property which specifies whether the transaction is to be initiated on the XFA client, on the XFA server, or both. Note that the XFA server need not be related to the web service server. The XFA server is the computer that served the template to the XFA client. The web service server may be located somewhere else and have no knowledge of XFA. Hence, runAt does not affect the web service server. Rather, it determines whether the XFA client, the XFA server, or both, may act as a client to the web service server.

The execute element also has an executeType property. This can take the values import and remerge. When the value is imported, the XFA processor updates the existing nodes in the Form DOM and Data DOM with the values from the Connection Data DOM. However if the value is re-merged, the existing nodes are not updated in place. Instead the Form DOM is cleared and a fresh merge operation is performed between the Template DOM and both the Connection Data DOM and the Data DOM. In this merge operation, as the template is traversed, candidate data for binding is sought not only in the Data DOM but also in the Connection Data DOM. If suitable data is found in the Connection Data DOM it is appended to the Data DOM. The result is that, if data from the Connection Data DOM can be appended the Data DOM and bound to the Form DOM, it is. But any data in the Connection Data DOM that does not match suitable template structure remains un-copied and is lost when the Connection Data DOM is cleared. The re-merge operation has the advantage that the output message can include dynamic structure (optional elements or variable numbers of occurrences of elements) and the form adapts just as it would to dynamic structure in an ordinary data document. However, many web services produce output messages with static structures which are more efficiently processed using import.

Figure 2:
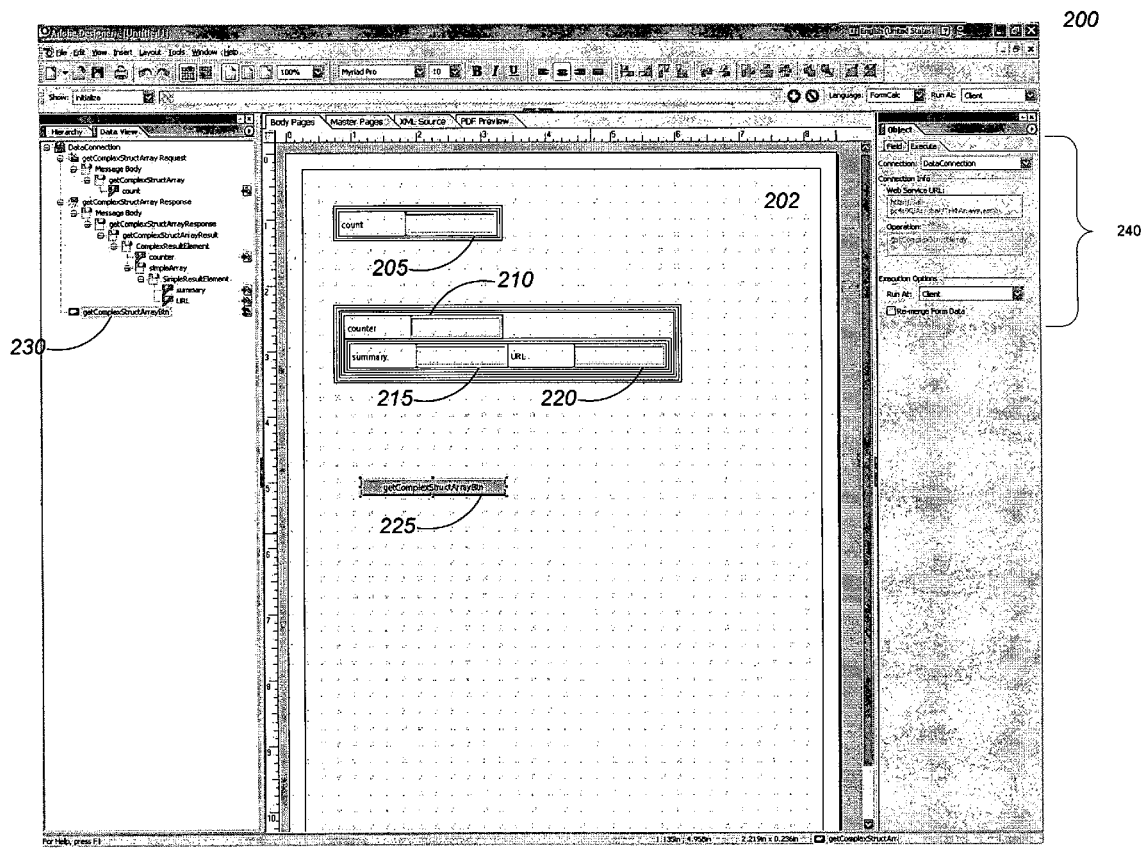
FIG. 2 shows a screenshot of a graphical interface to define new connections in a form.

In some implementations, a graphical user interface may be provided to allow a design user to design a form that binds specific fields to various data connections. FIG. 2 shows a graphical interface 200 of Adobe Designer, showing a relatively simple form 202 that has been designed by a design user. The form 202 has fields 205, 210, 215, and 220. The form also features a button 225 that is programmed to initiate communications with a data connection defined by the user. The design user has the ability to define specific attributes of each element of form 202. The design user may view the properties 240 that are set with respect to the button 225 by selecting the button 225 in the form 202. The data view 230 displays a view of the schema associated with the data connection. Some, all, or none of the schema associated with the data connection can be bound or connected to objects in the form. The design user can drag nodes from the data view 230 to generate forms objects on the form 202.

The design user can also use the interface to easily change the various properties that are associated with button 225 and form 202. The design user can modify the properties simply by replacing one value for another, choosing an appropriate selection from a dropdown list, or via an alternative method as defined by the interface developer.

As shown in FIGS. 3A-3D, the design user can also generate a new connection using the graphical interface 300. For example, the design user can select a button 305 in the user interface to bring up a menu 307, from which the design user can select "New Data Connection . . . " The user is presented (FIG. 3B) with a dialog box 320, from which the design user can choose a name 322 for the data connection, as well as select 324 the type of data connection. In the example shown, the name of the new data connection is DataConnection2, and the data connection is to a web service description language (WSDL) file. The WSDL file describes the operations provided by a specific web service.

Figure 3A:
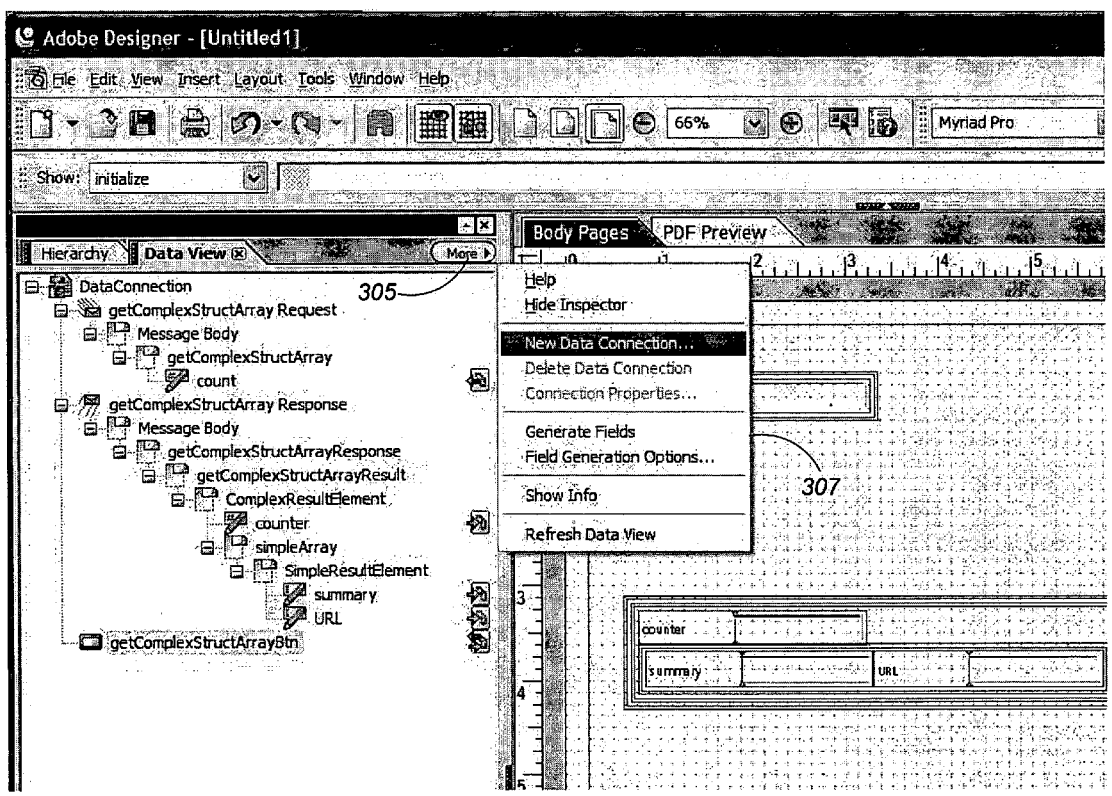
FIGS. 3A-3D show screenshots of a graphical interface illustrating how a new connection can be defined for a particular form.
Figure 3B:
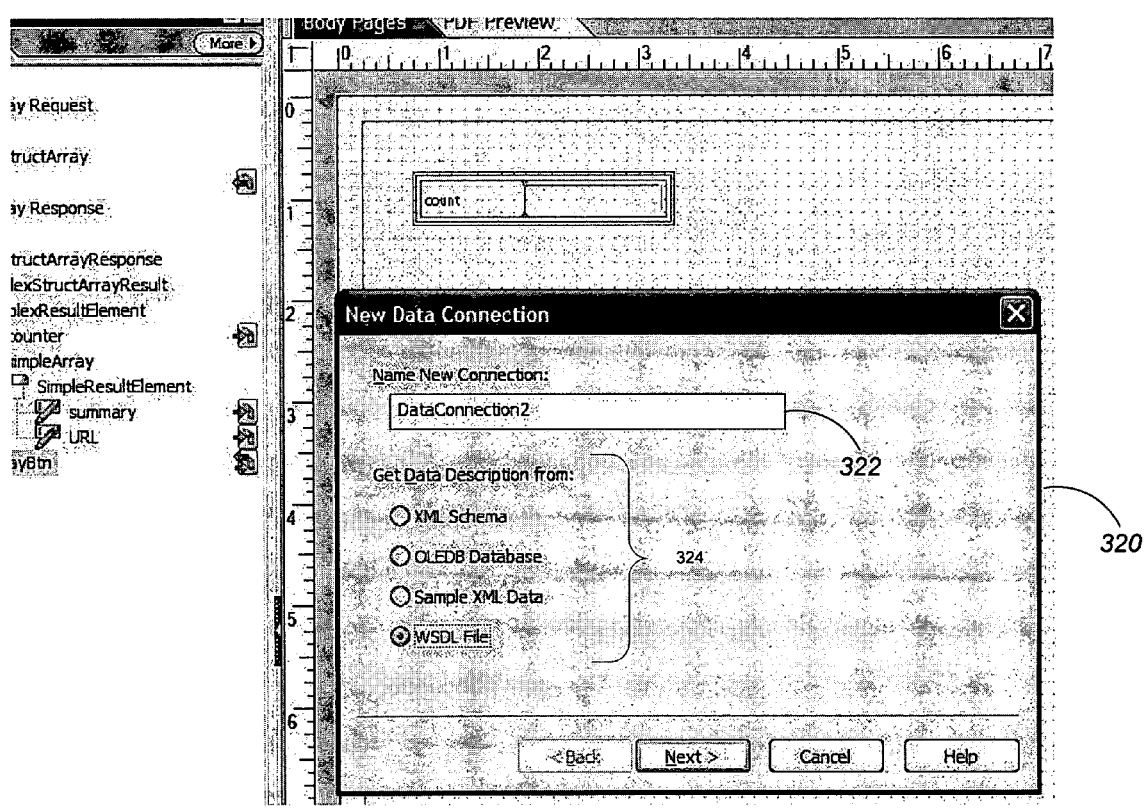
Figure 3C:
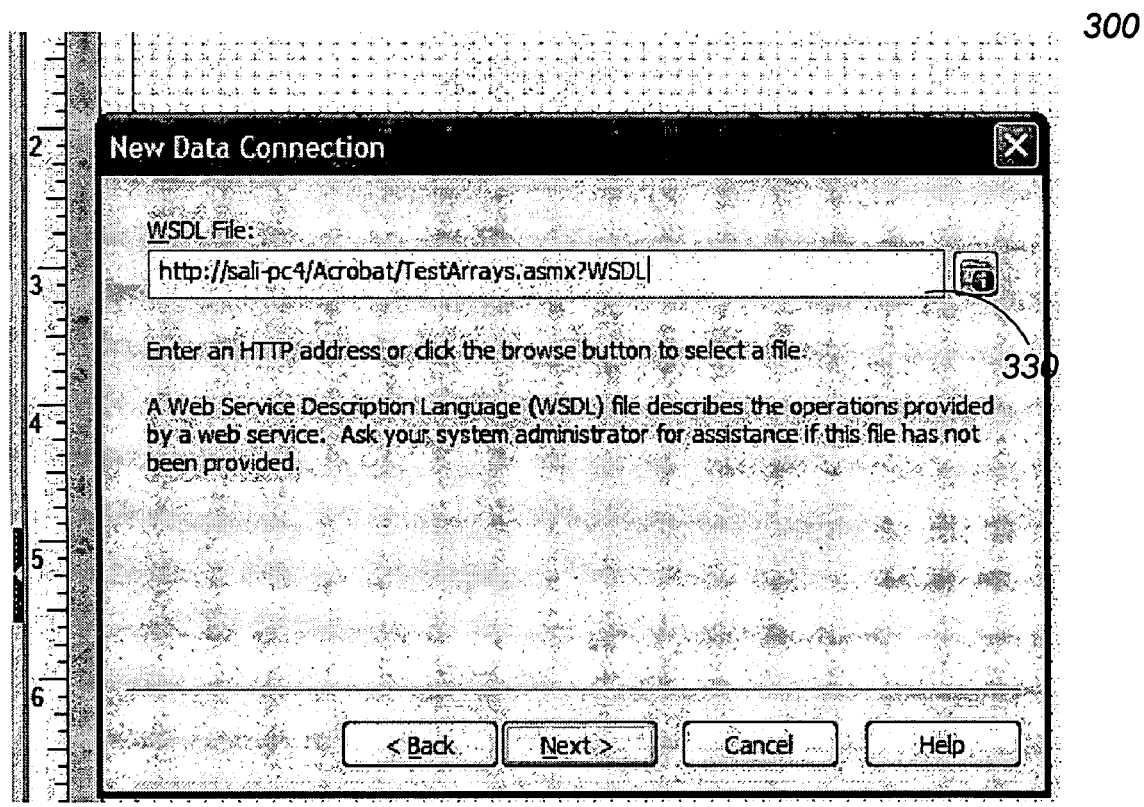
Figure 3D:
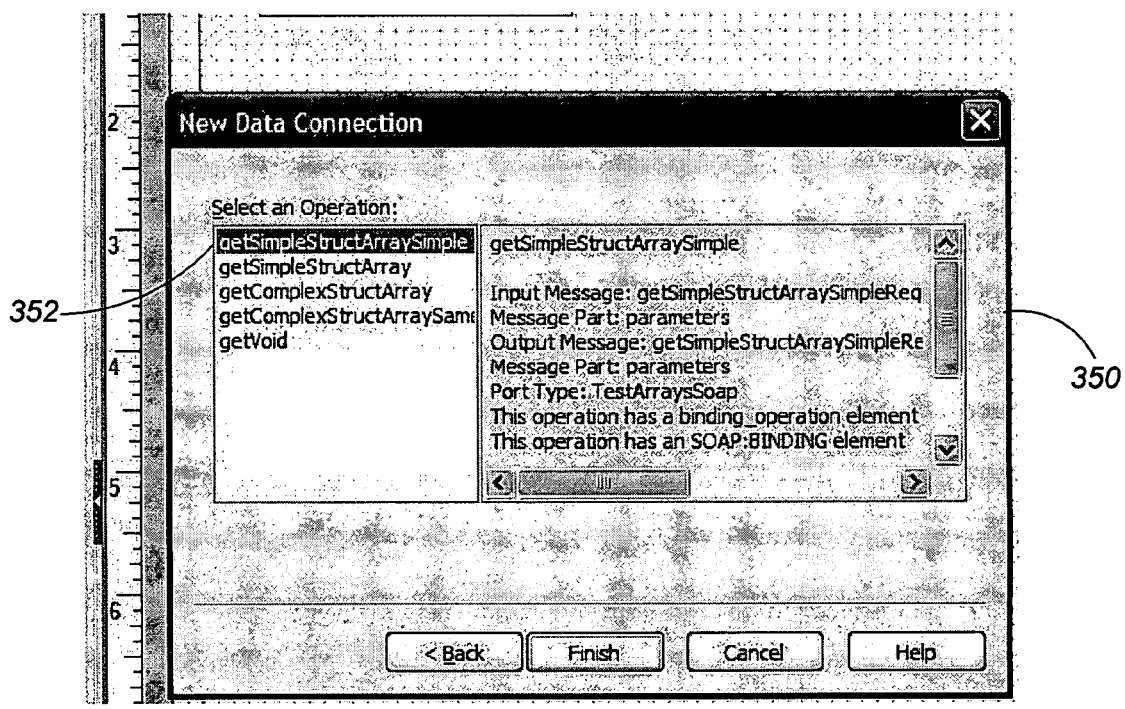

The design user can then enter the details indicating the location 330 of the data connection (FIG. 3C). In the case of a WSDL file, the design user provides the location 330 of the file. The file can be stored on the local computer, or on a server accessible via a network. In some implementations, the network can be a local area network, a wide area network, or the Internet. The system then parses the information provided by the data connection provided by the design user, and determines the operations that the data connection provides. In the case of a WSDL file, the system parses the WSDL file to determine the operations provided by the web service identified by the WSDL file. These operations are then presented to the design user in a dialog box 350, as shown in FIG. 3D. The design user can then select 352 the operation that the user wishes to link with the connection being generated.

Figure 4:
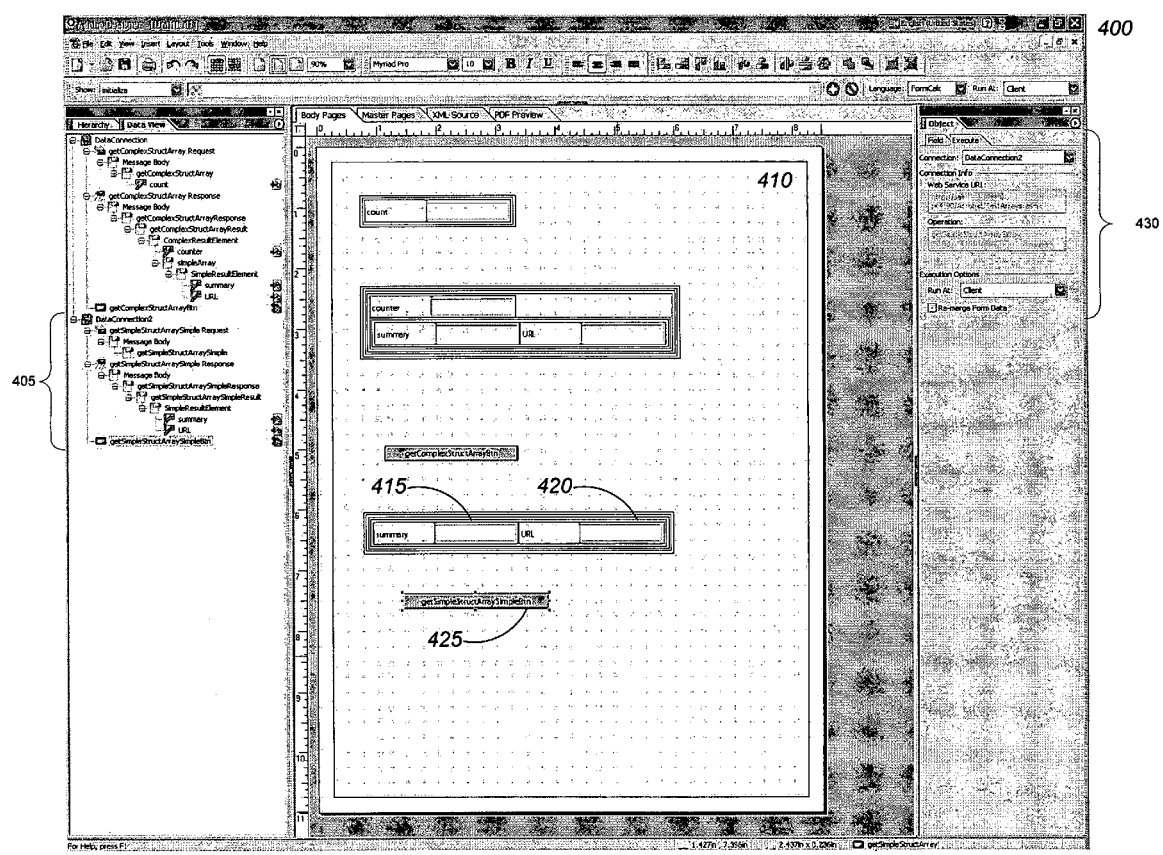
FIG. 4 shows a screenshot of a graphical interface after a new connection in a form has been defined.
Figure 5:
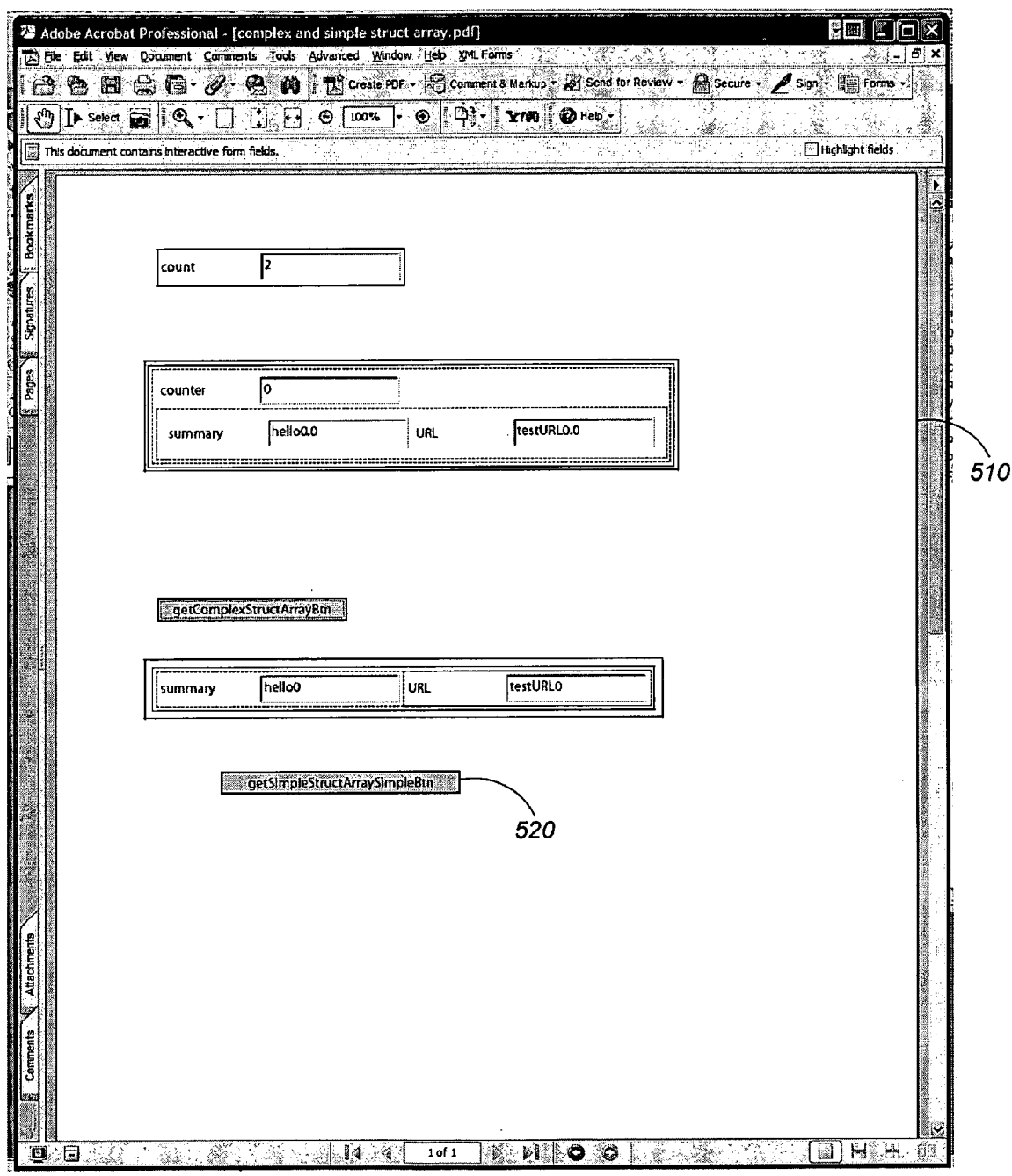
FIG. 5 shows a screenshot of the form designed in the graphical interface displayed in a client application.

Using the information provided by the design user, the system can generate the new connection element. As shown in FIG. 4, the user interface 400 now shows the DataConnection2 connection as a set of data view nodes in the data view 405. The user interface 400 partitions the input and output of the web service into two different hierarchies under the data connection. The design user can then drag and drop individual data view nodes from the data view 405 onto the form 410. For example, the design user can drag and drop fields 415 and 420 that are linked to DataConnection2 onto the form 400 from the appropriate node in data view 405. The design user can also drop a button 425, also a node in the data view 405, that will initiate communication with the data connection DataConnection2 using the data contained within fields 415 and 420. As before, the design user can also specify various properties 430 that are associated with the selected element. FIG. 5 shows a screenshot 500 of Adobe Acrobat displaying the form 510 that was created by the design user in Adobe Designer and stored in a Portable Document Format (PDF) file for use by the end user. The form 510 shown in FIG. 5 is the basic form as designed by the design user in the steps above. In most instances, the design user would further customize the form by adding text labels to fields and buttons, instead of the labels that are automatically generated by the user interface, as well as make the form more visually pleasing to the end user. For example, instead of the default text provided by the user interface for button 520 ("getSimpleStructArraySimpleBtn"), the design user can replace this with a text label that is more descriptive to the end user, such as "OK," "Continue," or "Process Data."

Figure 6A:
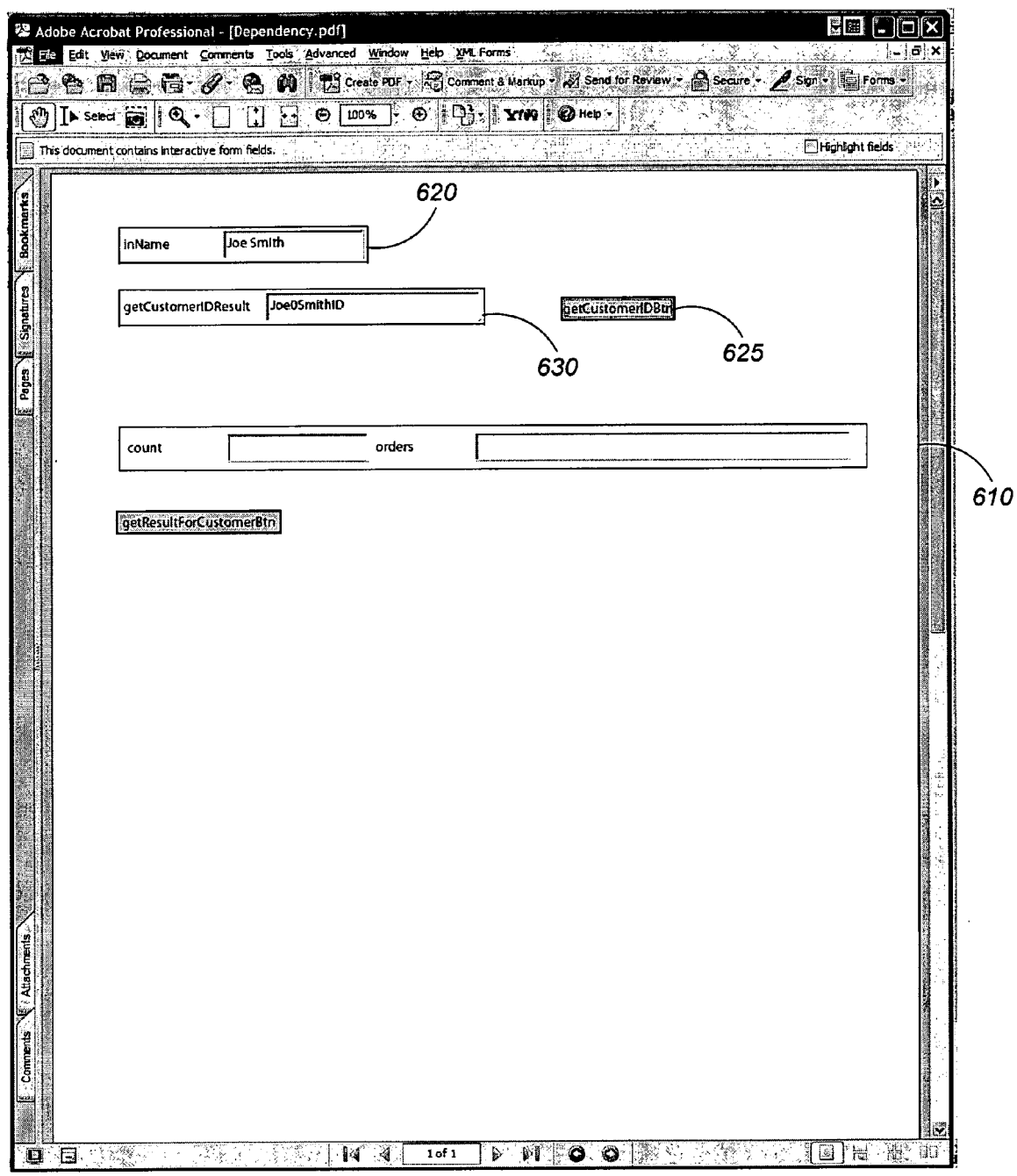
FIGS. 6A and 6B show screenshots of a form designed in the graphical interface displayed in a client application.
Figure 6B:
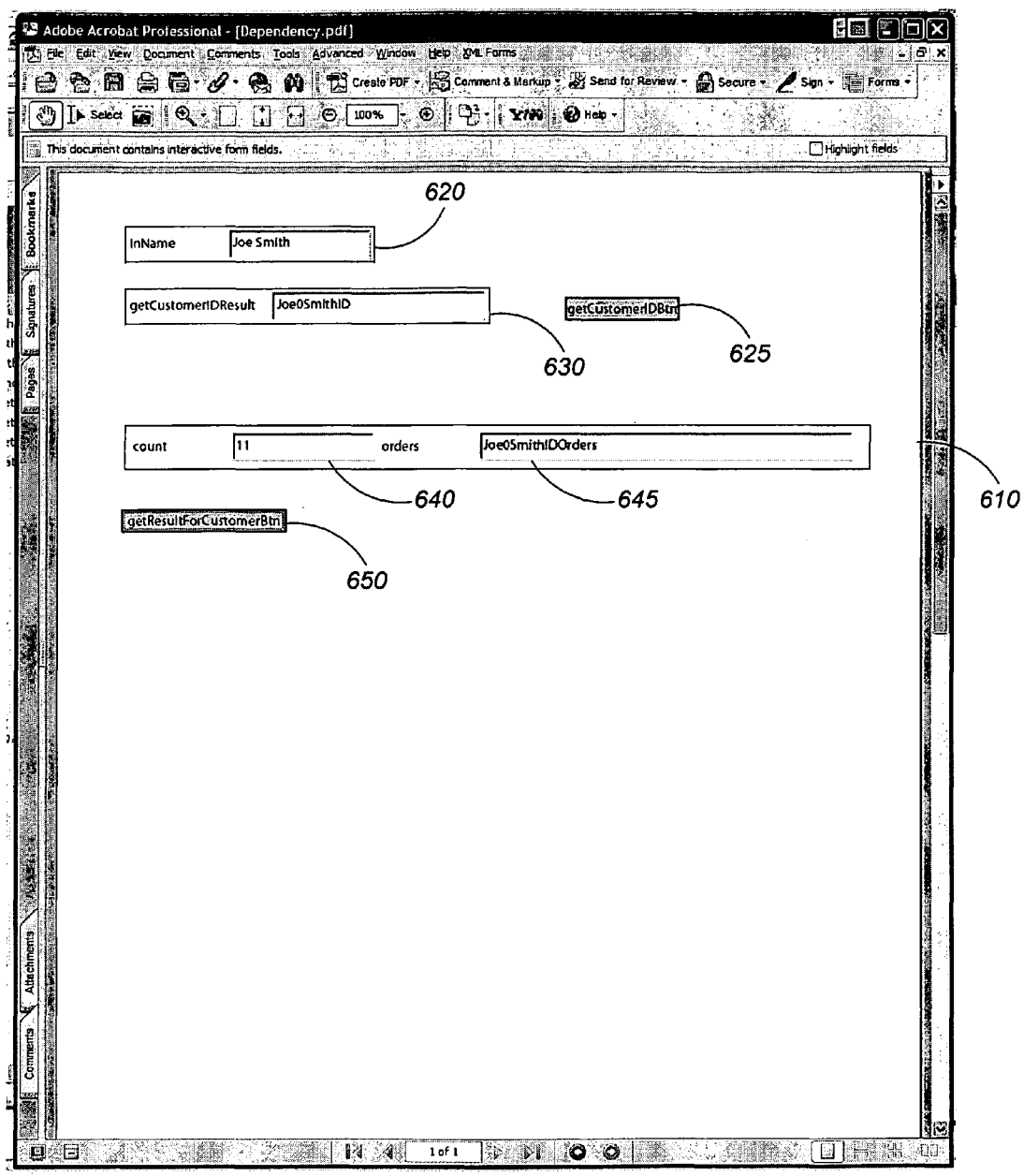

FIGS. 6A and 6B show a form 610 that contains a single field that both receives data from a data repository and sends data to a data repository. An end user can manually enter data in field 620. When the end user selects the button 625, the data contained in field 620 along with the properties associated with button 625 are sent to the appropriate data repository using the methods described above. Data received by the form from the data depository in response to the information sent to the data repository is placed in field 630. For example, in FIG. 6A, the end user can enter a customer name in field 620. Upon selecting the button 625, the customer name is sent to the appropriate database that contains information about customer contacts, and the database is instructed to search for the customer ID associated with the customer name. The customer ID is returned by the database, and displayed in field 630.

When the end user selects button 650, the data contained in field 630 along with the properties associated with button 650 are sent to an appropriate data repository using the methods described above. This data repository can be the same data repository as used in the previous step, or can be a different data depository. In either case, data received by the form from the data depository in response to the information sent to the data repository is placed in fields 640 and 645. For example, in FIG. 6B, when the end user selects button 650, the customer ID that was received in the previous step is sent to the appropriate database that contains information about customer orders, and the database is instructed to search for information about the orders placed by the customer associated with the customer ID that was sent to the database. The database returns this information to the form, and this information is displayed in fields 640 and 645. In this case, one field, field 630, was used to both receive data from one data repository and send the same data to another data repository. In some implementations, both data repositories can be the same data repository.

Alternatively, if the end user already knows the customer ID, the end user can input this information directly into field 630. In this event, the end user does not need to go through the process of looking up the customer ID, but can press button 650 and receive information about the orders placed by the customer associated with the customer ID that was provided by the end user.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer-implemented method comprising:
for entries that have been declared in a form and that identify available connections to data repositories and fields of the form that are associated with the connections, enabling a one-to-many mapping from fields in the form to one or more data repositories using declarative statements that specify a task to be performed, but not how the task is to be performed, wherein the entries comprise:
  one or more connect elements to indicate if a field of the form provides input, output, or both for at least one of the available connections associated with the field of the form; and
  a connection set comprising the at least one of the available connections, the method further comprising:
(i) aggregating data from fields throughout the form, wherein the aggregating comprises:
  inspecting the declarative statements to identify the fields throughout the form providing data to one of the available connections;
  collecting the data from the identified fields throughout the form;
(ii) exporting the aggregated data to a data repository associated with the one of the available connections, wherein the exporting comprises:

constructing a message containing the aggregated data, wherein the message is formatted based on a data description;
sending the message to the data repository;
(iii) importing data from the data repository, wherein the importing comprises:
receiving a response from the data repository, wherein the response contains the imported data in aggregated form;
(iv) distributing the imported data to fields throughout the form, wherein the distributing comprises:
inspecting the declarative statements to identify the fields throughout the form that receive data from the data repository;
identifying extra data contained within the imported data, the extra data being unassociated with existing identified fields of the form;
dynamically recreating the form to add extra fields corresponding to the extra data contained within the imported data;
separating the imported data into data corresponding to each of the identified fields and extra fields; and
providing the separated data to each of the identified and extra fields.

2. The method of claim 1, wherein the exporting further comprises:
altering the aggregated data using one or more scripts, wherein the altering includes modifying a data header of the aggregated data.

3. A computer-implemented method comprising:
for entries that have been declared in a form and that identify available connections to data repositories and fields of the form that are associated with the connections, enabling a one-to-many mapping from fields in the form to one or more data repositories using declarative statements that specify a task to be performed, but not how the task is to be performed, wherein the entries comprise:
one or more connect elements to indicate if a field of the form provides input, output, or both for at least one of the available connections associated with the field of the form; and
a connection set comprising the at least one of the available connections, the method further comprising:
(i) importing data from a data repository associated with one of the available connections, wherein the importing comprises:
receiving a response from the data repository, wherein the response contains the imported data in aggregated form;
(ii) distributing the imported data to fields throughout the form, wherein the distributing comprises:
inspecting the declarative statements to identify the fields throughout the form that receive data from the one of the available connections;
identifying extra data contained within the imported data, the extra data being unassociated with existing identified fields of the form;
dynamically recreating the form to add extra fields corresponding to the extra data contained within the imported data;
separating the imported data into data corresponding to each of the identified fields and extra fields; and
providing the separated data to each of the identified and extra fields.

4. The method of claim 3, wherein the importing further comprises:
altering the imported data using one or more scripts, while the imported data is still in aggregated form, wherein the altering includes modifying a data header of the imported data.

5. A non-transitory computer storage medium encoded with a computer program, the program comprising instructions that when executed by data processing apparatus cause the data processing apparatus to perform operations comprising:
for entries that have been declared in a form and that identify available connections to data repositories and fields of the form that are associated with the connections, enabling a one-to-many mapping from fields in the form to one or more data repositories using declarative statements that specify a task to be performed, but not how the task is to be performed, wherein the entries comprise:
one or more connect elements to indicate if a field of the form provides input, output, or both for at least one of the available connections associated with the field of the form; and
a connection set comprising the at least one of the available connections, the operations further comprising:
(i) aggregating data from fields throughout the form, wherein the aggregating comprises:
inspecting the declarative statements to identify the fields throughout the form providing data to one of the available connections;
collecting the data from the identified fields throughout the form;
(ii) exporting the aggregated data to a data repository associated with the one of the available connections, wherein the exporting comprises:
constructing a message containing the aggregated data, wherein the message is formatted based on a data description; and
sending the message to the data repository;
(iii) importing data from the data repository, wherein the importing comprises:
receiving a response from the data repository, wherein the response contains the imported data in aggregated form;
(iv) distributing the imported data to fields throughout the form, wherein the distributing comprises:
inspecting the declarative statements to identify the fields throughout the form that receive data from the data repository;
identifying extra data contained within the imported data, the extra data being unassociated with existing identified fields of the form;
dynamically recreating the form to add extra fields corresponding to the extra data contained within the imported data;
separating the imported data into data corresponding to each of the identified fields and extra fields; and
providing the separated data to each of the identified and extra fields.

6. The computer storage medium of claim 5, the exporting further comprising:
altering the aggregated data using one or more scripts, wherein the altering includes modifying a data header of the aggregated data.

7. A non-transitory computer storage medium encoded with a computer program, the program comprising instructions that when executed by data processing apparatus cause the data processing apparatus to perform operations comprising:

for entries that have been declared in a form and that identify available connections to data repositories and fields of the form that are associated with the connections, enabling a one-to-many mapping from fields in the form to one or more data repositories using declarative statements that specify a task to be performed, but not how the task is to be performed, wherein the entries comprise:
  one or more connect elements to indicate if a field of the form provides input, output, or both for at least one of the available connections associated with the field of the form; and
  a connection set comprising the at least one of the available connections, the operations further comprising:
(i) importing data from a data repository associated with one of the available connections, wherein the importing comprises:
  receiving a response from the data repository, wherein the response contains the imported data in aggregated form;
(ii) distributing the imported data to fields throughout the form, wherein the distributing comprises:
  inspecting the declarative statements to identify the fields throughout the form that receive data from the one of the available connections;
  identifying extra data contained within the imported data, the extra data being unassociated with existing identified fields of the form;
  dynamically recreating the form to add extra fields corresponding to the extra data contained within the imported data;
  separating the imported data into data corresponding to each of the identified fields and extra fields; and
  providing the separated data to each of the identified and extra fields.

8. The computer storage medium of claim 7, the importing further comprising:
  altering the imported data using one or more scripts, while the imported data is still in aggregated form, wherein the altering includes modifying a data header of the imported data.

* * * * *